United States Patent [19]
Dischert et al.

[11] Patent Number: 5,802,226
[45] Date of Patent: Sep. 1, 1998

[54] METHOD AND APPARATUS FOR VIDEO FADE EFFECT WITH A SINGLE VIDEO SOURCE

[75] Inventors: Lee Robert Dischert, Burlington; Miles A. Kaspar, III, Riverside, both of N.J.

[73] Assignee: Matsushita Electric Industrial Co., Ltd., Osaka, Japan

[21] Appl. No.: 623,650

[22] Filed: Mar. 29, 1996

[51] Int. Cl.$^6$ .................................................. G11B 27/00
[52] U.S. Cl. ......................................... 386/53; 386/109
[58] Field of Search ........................ 358/335, 342, 358/311, 310, 906, 909.1; 360/14.1, 14.2, 14.3, 32, 9.1; 348/239, 595, 584, 598; 386/4, 52, 33

[56] References Cited

U.S. PATENT DOCUMENTS

| | | |
|---|---|---|
| 3,993,864 | 11/1976 | Pye et al. . |
| 4,223,353 | 9/1980 | Keller et al. . |
| 4,340,903 | 7/1982 | Tamura . |
| 4,568,976 | 2/1986 | Trammell . |
| 4,613,906 | 9/1986 | Tanaka et al. . |
| 4,706,135 | 11/1987 | Kojima . |
| 4,833,538 | 5/1989 | Hieda . |
| 4,992,891 | 2/1991 | Komatsu et al. . |
| 4,999,704 | 3/1991 | Ando ........................... 348/401 |
| 5,003,404 | 3/1991 | Yoshimura et al. . |
| 5,126,847 | 6/1992 | Kori et al. . |
| 5,132,798 | 7/1992 | Yoshimura et al. . |
| 5,159,462 | 10/1992 | Yasumura et al. . |
| 5,168,363 | 12/1992 | Kojima et al. ................ 348/704 |
| 5,170,264 | 12/1992 | Saito et al. ................... 358/433 |
| 5,239,419 | 8/1993 | Kim . |
| 5,287,187 | 2/1994 | Sato et al. . |
| 5,418,658 | 5/1995 | Kwon ........................... 386/111 |
| 5,434,673 | 7/1995 | Inoue et al. .................. 386/95 |
| 5,583,577 | 12/1996 | Tsukagoshi ................. 348/468 |

OTHER PUBLICATIONS

Proposed Video Format is at Work in Matsushita Camcorders JEI Sep. 1995, 41.

*Primary Examiner*—Andrew I. Faile
*Assistant Examiner*—Aung S. Moe
*Attorney, Agent, or Firm*—Ratner & Prestia

[57] ABSTRACT

An apparatus for mixing portions of a video signal produced by a single video source. The apparatus includes an input terminal for receiving a current video signal. A memory, coupled to the input terminal, receives the current video signal and stores a plurality of frames of the current video signal to produce a delayed video signal. A mixer, coupled to the input terminal and the memory, combines the current video signal and the delayed video signal to produce a mixed video signal. The mixer may combine video signals in a first domain, such as the spatial domain, or video signals that have been transformed into a second domain, such as the spatial frequency domain.

6 Claims, 14 Drawing Sheets

METHOD AND APPARATUS FOR VIDEO FADE EFFECT WITH A SINGLE VIDEO SOURCE

BACKGROUND OF THE INVENTION

1. Field of the Invention

The invention relates generally to a method and apparatus for producing a video fade effect, and in particular, to a method and apparatus for mixing portions of a video signal produced by a single video signal source.

2. Description of the Related Art

Figure 1:
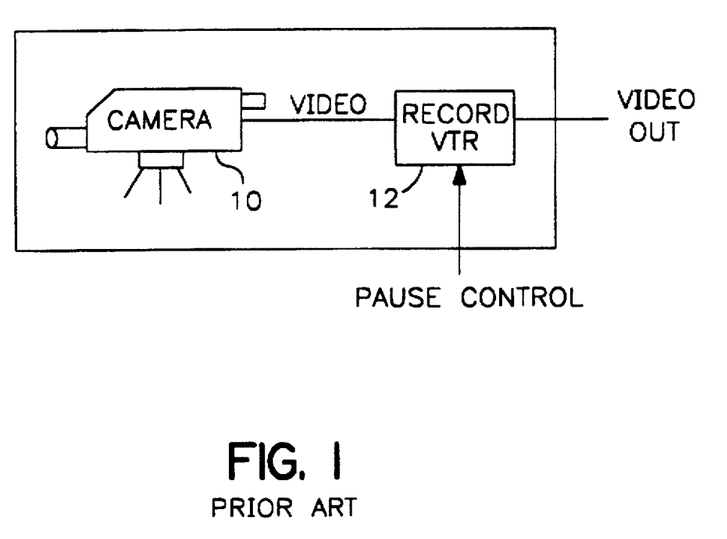
FIG. 1 (prior art) is a block diagram of a conventional apparatus for combining two scenes produced by a single video source.

Production of quality video often requires fading from one scene to the next. FIG. 1 is a block diagram of a conventional apparatus for generating a transition between scenes in a video signal produced by a single video source. Camera 10 produces a video signal which is provided to a video tape recorder 12. The video tape recorder 12 includes a pause function which is controlled by a pause control signal. To provide a transition from one scene to the next, the video tape recorder 12 is paused while camera 10 is producing the first scene. When camera 10 begins producing the second scene, recording by the video tape recorder 12 is resumed. This produces an abrupt change from the first scene to the second scene and lacks the fade effect, where the intensity of the first scene is gradually reduced while the intensity of the second scene is gradually increased.

Figure 2:
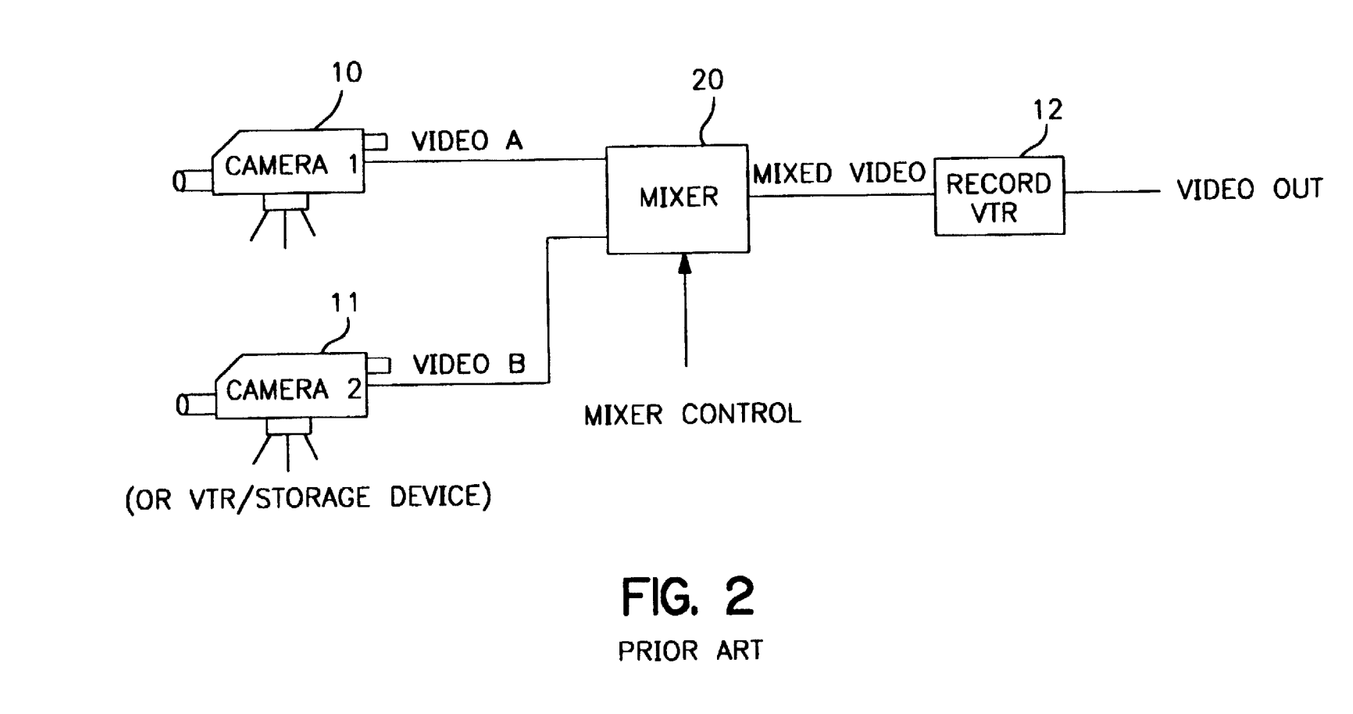
FIG. 2 (prior art) is a block diagram of a conventional apparatus for mixing video scenes produced by two video sources.

FIG. 2 is a block diagram of a conventional apparatus for producing a video fade effect between two scenes. Camera 10 produces the first scene as video signal A and provides video signal A to a mixer 20. Camera 11 produces the second scene as video signal B and also provides video signal B to mixer 20. One or both of the cameras may be replaced by a storage device such as a video tape recorder or a CD ROM. The mixer 20 is controlled by a mixer control signal. When the mixer control signal is enabled, the mixer circuit 20 produces the fade effect between video signal A and video signal B. The intensity of video signal A is decreased while the intensity of video signal B is increased thereby producing a gradual transition from the first scene to the second scene. The mixed video signal is provided to a video tape recorder 12 for recording. A drawback of the apparatus shown in FIG. 2 is that two video signal sources are required to produce the fade effect between two scenes.

Another exemplary system is disclosed in U.S. Pat. No. 4,992,891 entitled DUAL RECORD/READ HEAD VIDEO RECORDING AND PLAYBACK APPARATUS WITH FADE-IN FUNCTION, to Komatsu et al. This patent describes a system which uses two video heads to produce a fade effect. In this system, a first scene is recorded and then the VTR is stopped and rewound such that the portion of the first scene that is to be used in the fade is picked up by a first one of the two video heads. The played back signals representing this scene are mixed with new video data being received from the camera and the result is recorded over the final portion of the first scene to produce the fade effect. This method of producing a fade effect is undesirable because it requires a second head, which adds expense to the VTR. This system also requires the user to rewind the tape in order to locate the portion of the first scene that is to be imaged. This method of specifying which part of the first scene is to be used in the fade is inherently inaccurate and may result in more or less of the first scene being used than had been intended.

SUMMARY OF THE INVENTION

The present invention is an apparatus for mixing portions of a video signal produced by a single video signal source.

A first embodiment of the invention is a device having an input terminal for receiving a current video signal. A memory, coupled to the input terminal, receives the current video signal and store a plurality of frames of the current video signal to produce a delayed video signal. A mixer, coupled to the input terminal and the memory, receives and combines the current video signal and the delayed video signal to produce a mixed video signal.

A second embodiment of the invention is a device for mixing portions of a video signal produced by a single source. The device includes a recording section and a playback section. The recording section includes a transformer for converting the video signal from a first domain to a second domain to produce a transformed video signal. A mixer receives and combines the transformed video signal and a transformed playback video signal from the playback section to produce a mixed video signal. An encoder coupled to the mixer encodes the mixed video signal to produce an encoded video signal. A recorder stores the encoded video signal to a recording medium. The playback section includes a reader for retrieving an encoded video signal from a recording medium to produce an encoded playback video signal. A decoder decodes the encoded playback video signal to produce the transformed playback video signal.

BRIEF DESCRIPTION OF THE DRAWINGS

FIG. 9b is a graph of the mixing coefficient used in the circuit shown in FIG. 9a.

FIG. 10a is a second mixing circuit for use in the embodiment shown in FIG. 3 and FIG. 8.

FIG. 10b and 10c are graphs showing the mixing coefficients used in the mixing circuit of FIG. 10a.

DETAILED DESCRIPTION OF THE INVENTION

Figure 3A:
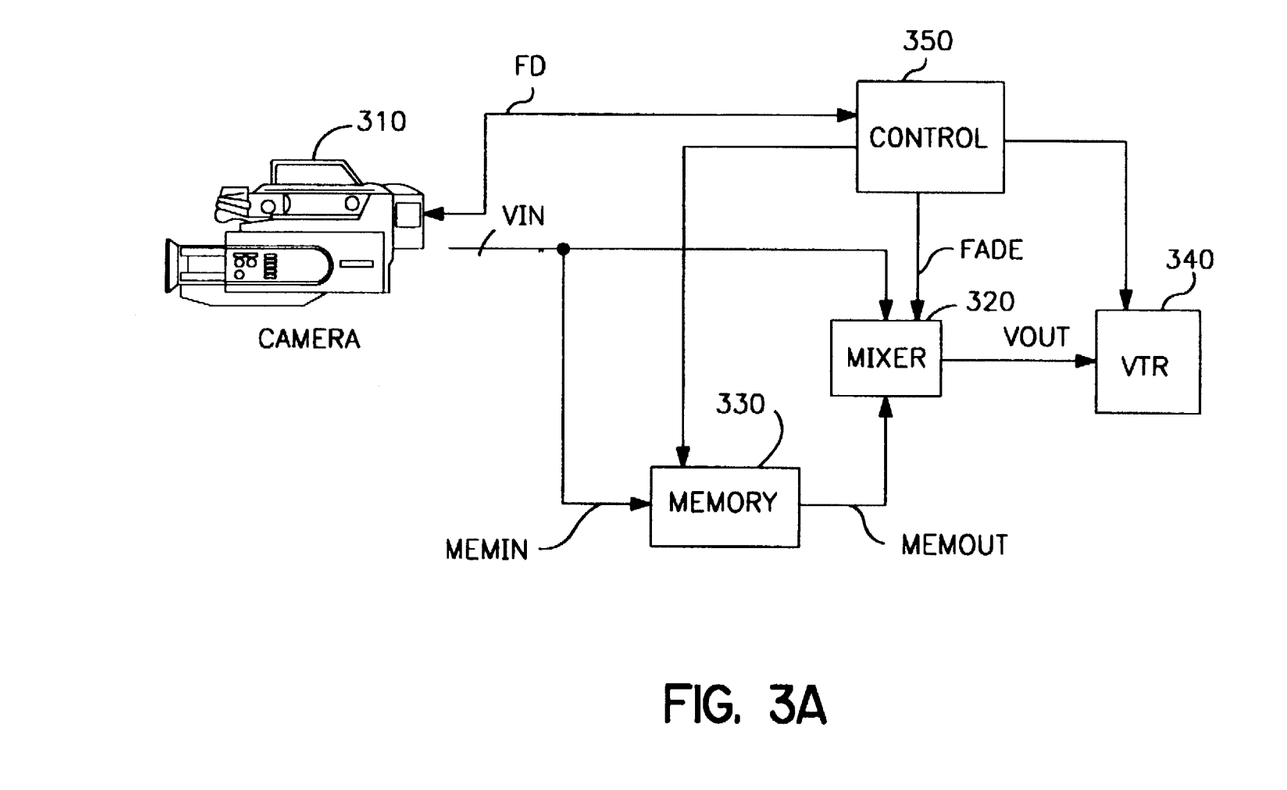
FIG. 3A is a block diagram of an apparatus for producing a video fade effect with a single video source.
Figure 3B:
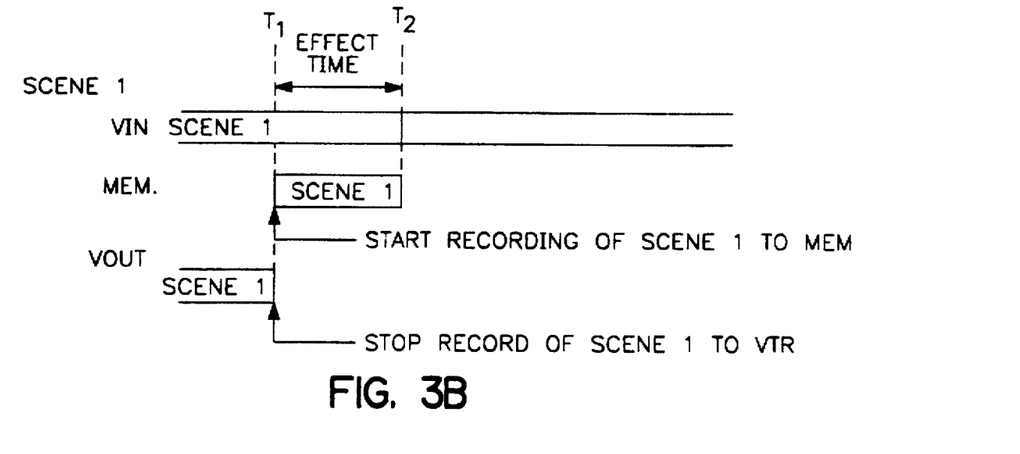
FIGS. 3B, 3C and 3D are timing diagrams which are useful for describing the operation of the apparatus shown in FIG. 3A
Figure 3C:
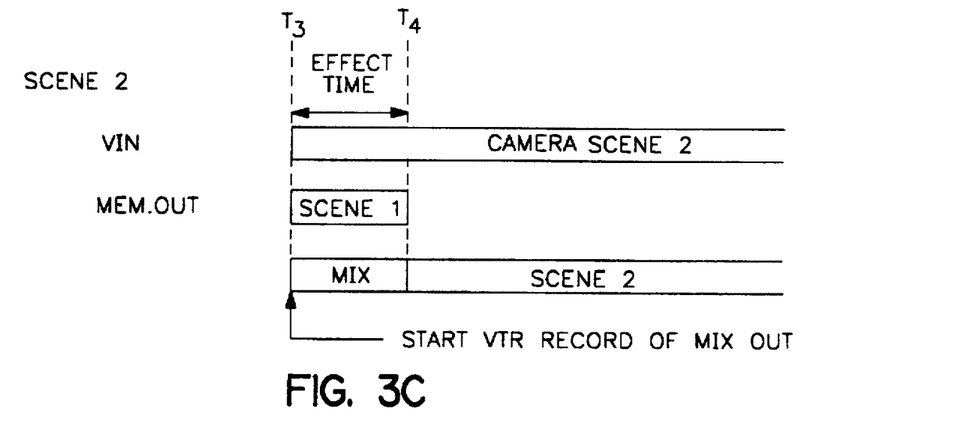
Figure 3D:
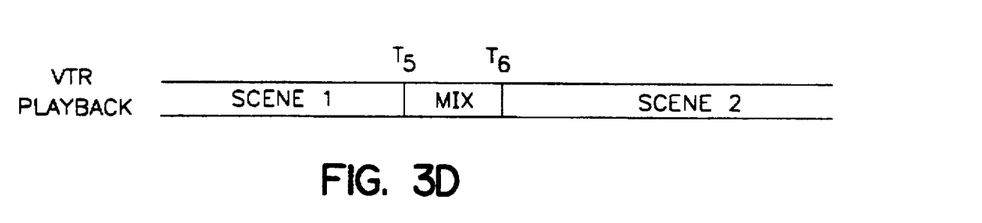
Figure 3E:
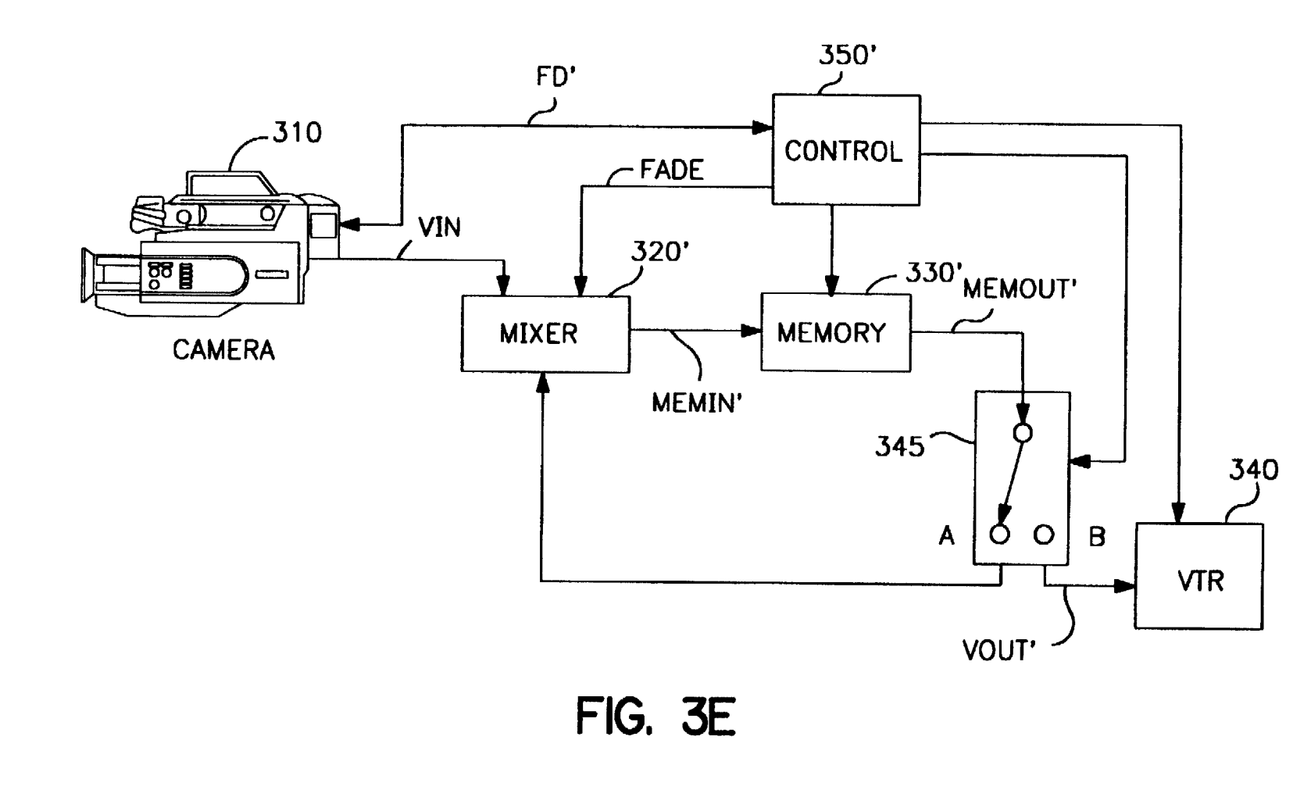
FIG. 3E is a block diagram of an alternative apparatus for producing a video fade effect with a single video source.

FIGS. 3A and 3E are a block diagrams of apparatus for mixing multiple scenes produced by a single video source for recording on a video tape recorder (VTR). Camera 310 produces a single video signal which is provided to a video memory 330 and a mixer 320. Video memory 330 stores a plurality of frames of the video signal. In an exemplary embodiment of the invention, video memory 330 stores approximately one second of video from camera 310. Video memory 330 may be implemented using a first-in/first-out buffer which continually stores a plurality of frames of the video signal. Mixer 320 is controlled by a mixer control signal, MXC, which may be provided by control circuitry 350. The details of the mixer 320 are described below with reference to FIGS. 9a–9b and 10a–10c. The mixed video signal is provided to a video tape recorder 340 where the mixed video signal is stored on a recording medium.

The apparatus shown in FIG. 3A provides mixing of two video scenes while only requiring a single video signal source. Because video memory 330 stores a plurality of frames of the video signal, two images, each including moving objects, may be mixed. The video memory 330 and the mixing circuit 320 may be combined in a stand alone device having an input terminal for receiving the video signal from camera 310 and an output terminal for providing the mixed video signal to video tape recorder 340. A consumer can edit home videos easily without having to provide a second video signal source such as a second camera or a second video tape recorder.

The operation of the apparatus shown in FIG. 3A is described with reference to FIGS. 3B, 3C and 3D. FIG. 3A represents a time at which the first scene is being imaged, FIG. 3B represents a time at which the second scene is being imaged and FIG. 3c represents a time at which the merged first and second scenes are being played-back from the VTR.

The apparatus shown in FIG. 3A includes a Fade control (not shown) on the camera 310. With reference to FIG. 3B, when the Fade control is activated at time T1, a signal is sent to the control circuitry 350 via the control line FD. This signal causes the control circuitry to pause the VTR 340 and enable the memory 330 to store the next one second of video that is recorded by the camera. At the end of the one second (at time T2), the control circuitry signals the user, via the control line FD that the second scene may be imaged.

Referring to FIG. 3C, when, at time T3, the user again activates the record control on the camera 310, the camera notifies the control circuitry via the control line FD and the control circuitry, in turn, removes the pause from the VTR 340 so that it can begin recording, enables the memory 330 to begin to provide the stored one second of video from the first scene a first input port of the mixer 320 and directs the camera 310 to provide the scene currently being imaged to a second input port of the mixer 320. During the next one-second interval (between times T3 and T4), the mixed first and second scenes are recorded, as described below with reference to FIGS. 9A and 9B, responsive to a fade control signal, Fade, provided by the control circuitry 350 to the mixer 320. After time T4, the VT 340 records the second scene as it would in normal operation.

FIG. 3D shows how the image signals recorded on the tape is played back. First, scene 1 would appear. Between times T5 and T6, scene 1 fades to scene 2 and after T6, scene 2 is played back.

FIG. 3E is a block diagram of an alternative implementation of a single-camera fade circuit. This circuit includes the camera 310, a control circuit 350', a mixer 320', a memory 330', a VTR 340' and a switch 345. This alternative system is described with reference to FIGS. 3F and 3G.

Figure 3F:
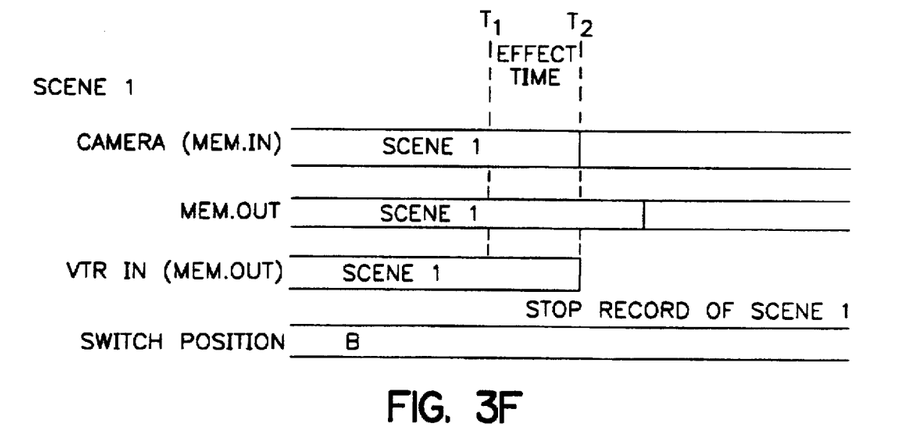
FIGS. 3F and 3G are timing diagrams which are useful for describing the operation of the apparatus shown in FIG. 3E

As shown in FIG. 3F, switch 345 is in position B the entire time that scene 1 is being recorded. In this position, switch 345 directs the video data provided by the camera 310 through the mixer 320' and memory 330' into the VTR 340'. In this mode, the mixer 320' passes the camera signal at full amplitude. In the exemplary system, memory 330' holds approximately one second of video data. When, at time T1, the user determines that a fade effect should begin, the camera sends a signal to the control circuitry 350. The control circuitry, at time T2, delayed by one second from time T1, signals the VTR 340' to pause its recording. At time T2, the data in the memory 330' represents the latest one-second of video information captured by the camera 310.

Figure 3G:
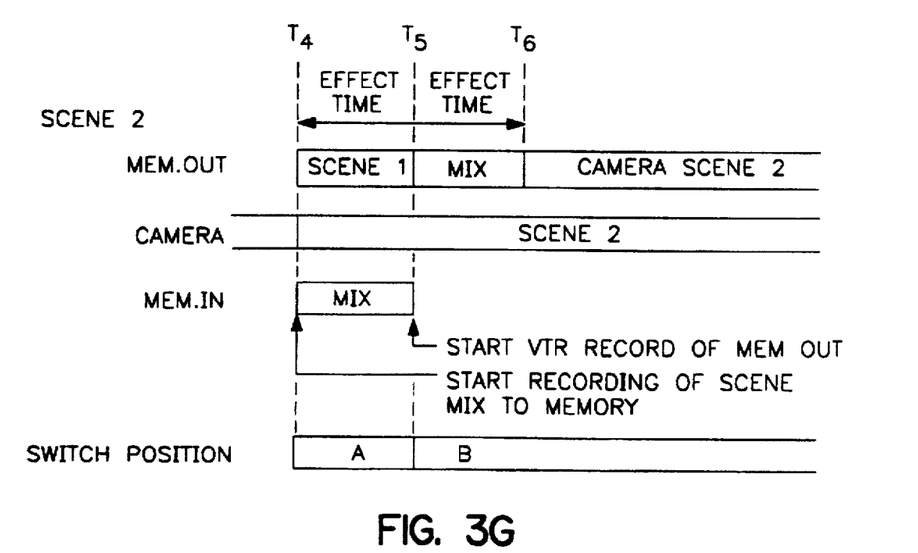

At time T4, shown in FIG. 3G, the camera 310 sends a signal to the control circuitry 350' that it is ready to begin imaging scene 2. At this instant, the controller changes the switch from position B to position A. This applies the last one-second of video information held in the memory 330' to one input port of the mixer. The other input port of the mixer is coupled to receive the signal from camera 310 representing the start of scene 2. During the interval between time T4 and T5, the circuitry shown in FIG. 3G mixes the last one second of scene 1 with the first one second of scene 2 and stores the result into the memory 330'. At time T5, the control circuit 350' changes the switch position back to B, and activates the VTR 340' causing the mixed video data from scenes 1 and 2 to be recorded. At time T6, the mixed video data has been recorded and the video signal from camera 310 is provided at full amplitude.

As an alternative to the operation described above, the user control in FIGS. 3A or 3E may indicate the end of the fade interval in the first scene rather than the start. In this alternative, the VTR 340' would be paused at time T1 and the data that would be mixed from scene 1 would be that occurring in the one second before time T1.

Figure 4:
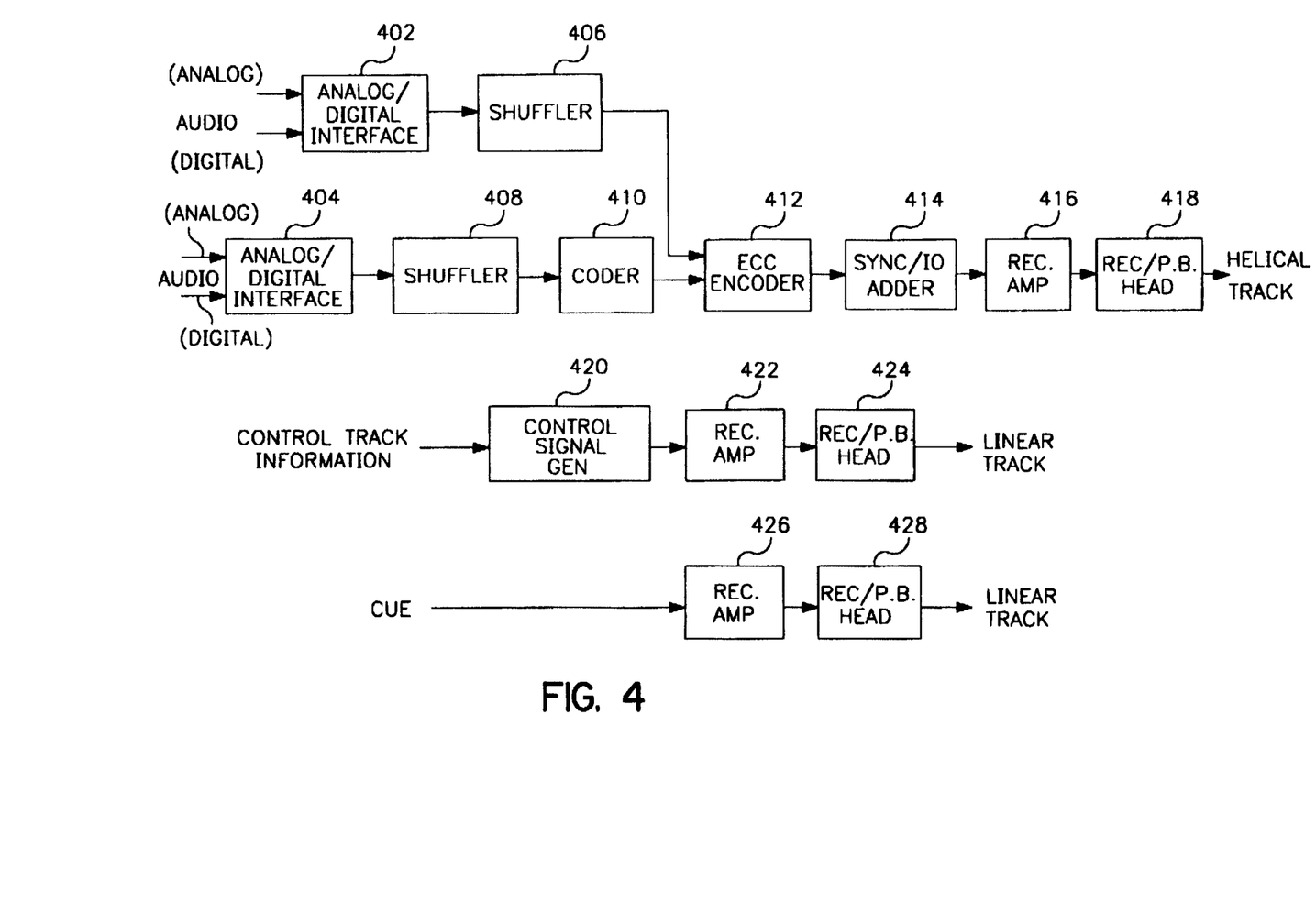
FIG. 4 is a block diagram of the recording components in a digital video tape recorder.

FIG. 4 is a block diagram of the components in the record portion of a digital video tape recorder. An audio signal is provided to an analog/digital interface 402. The output signal from the analog/digital interface 402 is provided to a shuffler 406. Shuffler 406 rearranges portions of the audio signal to provide accurate image reproduction during trick play modes (such as fast forward) and to distribute errors caused by defects in the tape over a larger audio surface. The output signal from shuffler 406 is provided to an error correction code (ECC) encoder 412.

A video signal is provided to an analog/digital interface 404. The output video signal from the analog/digital interface 404 is provided to shuffler 408 which also rearranges portions of the digital video signal to provide for accurate reproduction of the video signal during trick play modes (such as fast forward) and to distribute errors caused by defects in the tape over a larger video surface. The output signal from shuffler 408 is provided to coder 410. The details of coder 410 are described below with reference to FIG. 6. The output signal from coder 410 is also provided to the ECC encoder 412. ECC encoder 412 adds error correction codes to the audio and video signals. Sync/ID adder 414 inserts into the output signal from ECC encoder 412 synchronization and identification information which is used upon playback. Recording amplifier 416 amplifies the encoded audio and video signals and forwards the amplified signals to record/playback head 418. Record/playback head 418 stores the encoded audio and video signals on the helical track of a recording medium such as magnetic tape.

The record section also includes a control signal generator 420 which receives control track information and produces a control signal. The control signal is provided to a recording amplifier 422 and a record/playback head 424 for recording the control signal on the linear track of the recording medium. A cue signal is also provided to a recording amplifier 426 and a record/playback head 428 for storage on a second linear track of the recording medium.

Figure 5:
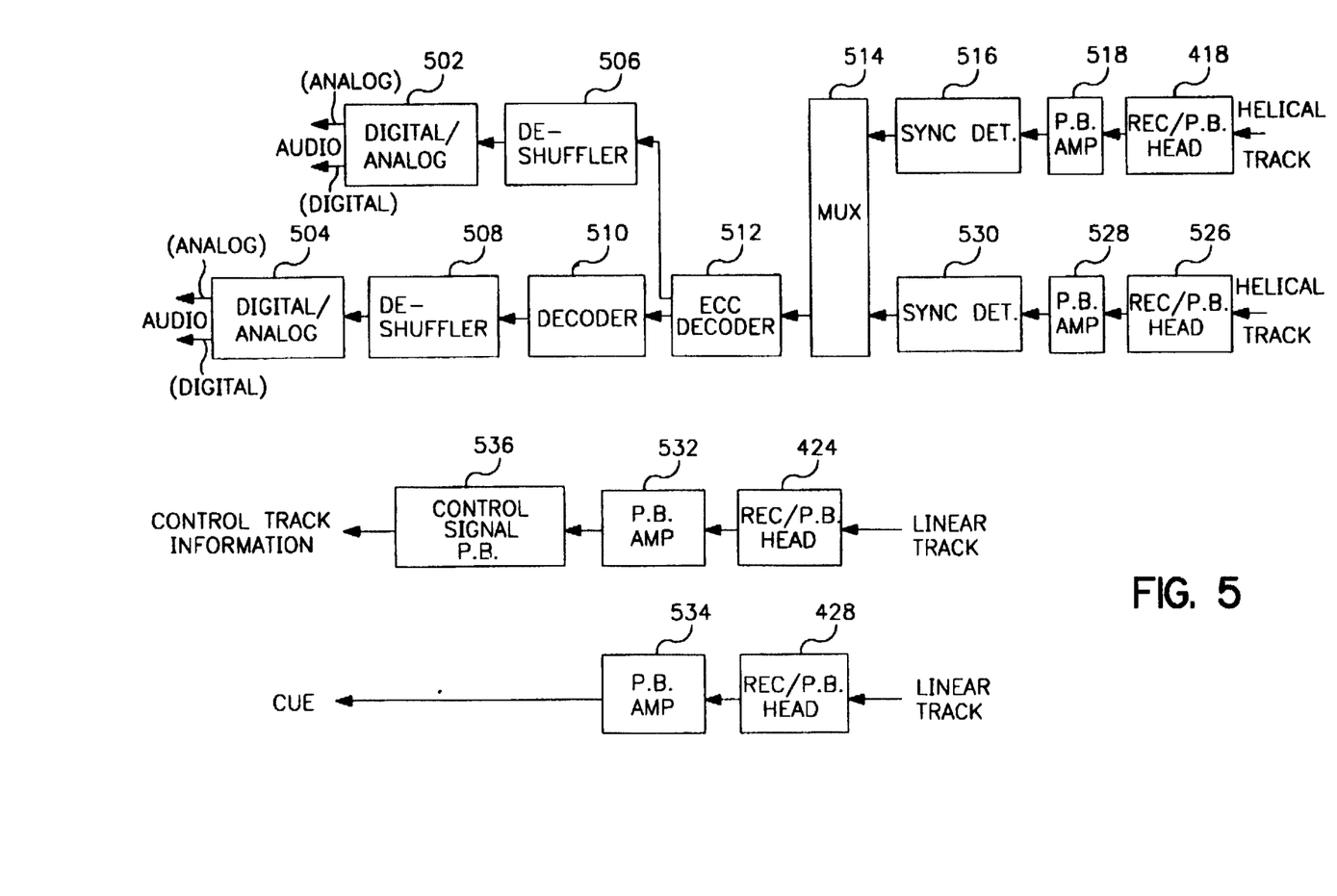
FIG. 5 is a block diagram of the playback components in a digital video tape recorder.

FIG. 5 is a block diagram of the playback portion of the video tape recorder. A record/playback head 418 reads the audio and video signals from the storage medium and provides the audio and video signals to a playback amplifier 518. The amplified audio and video signals are provided to a sync detector 516 which detects the synchronization and identification information inserted by sync/ID adder 414 shown in FIG. 4. The output of sync detector 516 is provided to multiplexer 514. Playback head 526 reads audio and video signals from the storage medium during trick play modes. The trick play audio and video signals are provided to a playback amplifier 528 and a sync detector 530. The output signal of the sync detector 530 is provided to multiplexer 514. Multiplexer 514 selects one of the signals from record/playback head 418 and playback head 526 and provides an output signal to an error correction code (ECC) decoder 512. The ECC decoder 512 detects the error correction codes produced by ECC encoder 412 (shown in FIG. 4) to determine if any errors have occurred upon playback. The ECC decoder 512 also separates the audio signal from the video signal. The audio signal is provided to a deshuffler 506 where portions of the audio signal previously shuffled by shuffler 406 are returned to their original order. The deshuffled audio signal is provided to digital/analog interface 502 which generates an audio output signal.

The video signal produced by ECC decoder 512 is provided to decoder 510. The details of decoder 510 are described below with reference to FIG. 7. The decoded video signal is provided to deshuffler 508 where portions of the video signal originally rearranged by shuffler 408 are reinstated to their original order. The deshuffled video signal is provided to digital/analog interface 504. The digital/analog interface 504 generates a video output signal. A record/playback head 424 reads a control signal from the linear track of the recording medium. The signal from the linear track of the recording medium is provided to a playback amplifier 532. A control signal playback circuit 526 receives an output signal from the playback amplifier 532 and produces the control track information. A record/playback head 428 reads the cue signal from the linear track which is amplified by a playback amplifier 534.

Figure 6:
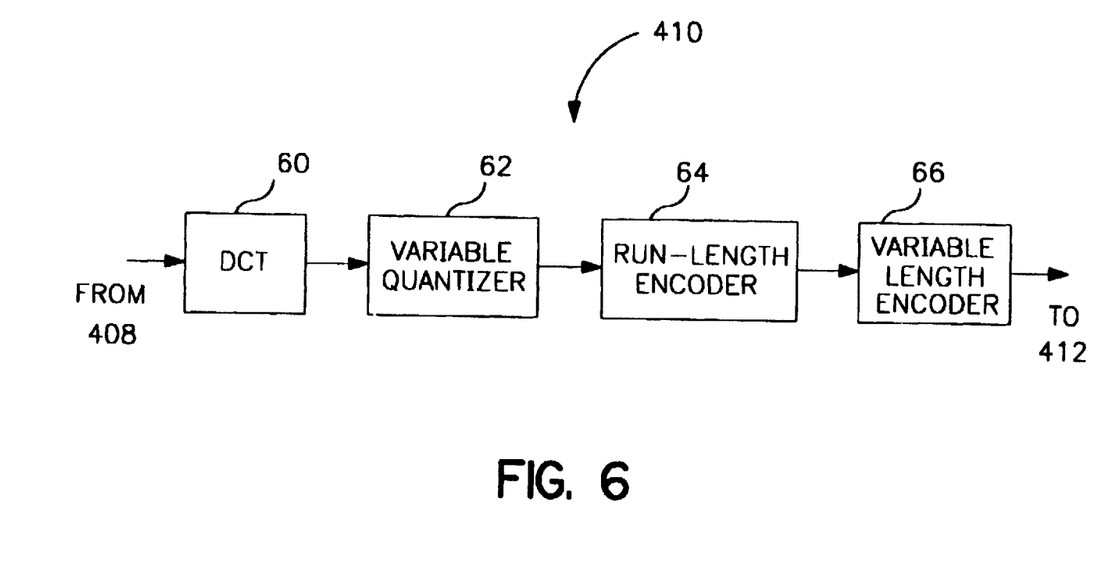
FIG. 6 is a detailed view of the coder shown in FIG. 4.

FIG. 6 is a detailed view of the coder 410 shown in FIG. 4. Coder 410 includes a discrete cosine transform (DCT) circuit 60 which converts the digital video signal provided by shuffler 408 from a first domain, such as the spatial domain, to a second domain, such as the spatial frequency domain. It is understood that a variety of other transforms may be used instead of the discrete cosine transform. The DCT circuit 60 produces a transformed video signal which is provided to variable quantizer 62. The variable quantizer 62 assigns a predetermined number of bits to the coefficients produced by the DCT circuit 60. The output signal from variable quantizer 62 is provided to a run-length encoder 64. Run-length encoder 64 performs a conventional run-length encoding process on the variable quantized DCT coefficients. The output signal from the run-length encoder 64 is provided to variable length encoder 66. The variable length encoder 66 implements a conventional Huffman-type coding scheme in which the most frequently occurring data is assigned the shortest length code. The output signal from variable length encoder 66 is provided to the ECC encoder 412 shown in FIG. 4.

Figure 7:
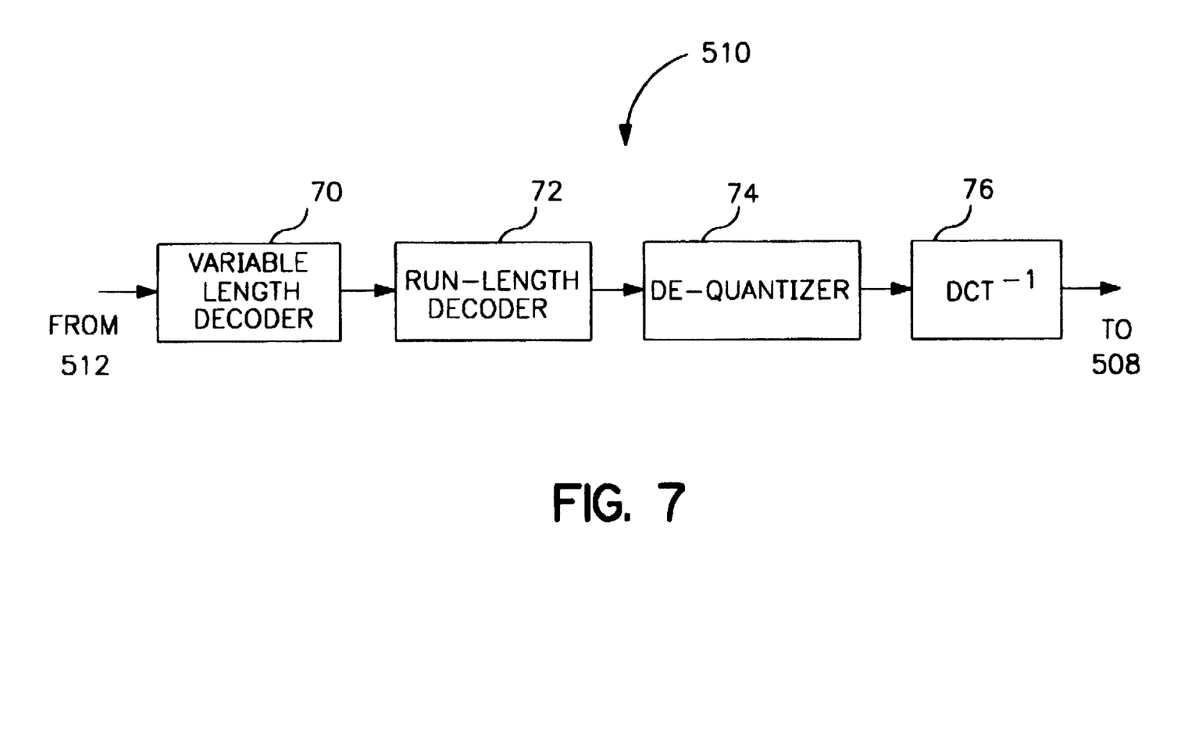
FIG. 7 is a detailed view of the decoder shown in FIG. 5.

FIG. 7 is a block diagram of the decoder 510 shown in FIG. 5. Decoder 510 performs the inverse operations as coder 410 shown in detail in FIG. 6. Variable length decoder 70 receives the encoded digital video signal from ECC decoder 512. Variable length decoder 70 performs the inverse coding operation of that performed by variable length encoder 66 shown in FIG. 6. The output signal from the variable length decoder 70 is provided to run-length decoder 72. Run-length decoder 72 performs the inverse coding operation performed by run-length encoder 64 shown in FIG. 6. Dequantizer 74 receives the output signal from run-length decoder 72 and performs the inverse operation of that performed by variable quantizer 62 shown in FIG. 6. Inverse DCT circuit 76 receives the output signal from dequantizer 74 and transforms the input signal from a second domain, such as the spatial frequency domain, to a first domain, such as the spatial domain. Inverse DCT circuit 76 performs the inverse operation of that performed by DCT circuit 60 shown in FIG. 6. The output signal from inverse DCT circuit 76 is provided to deshuffler 508 shown in FIG. 5.

Figure 8:
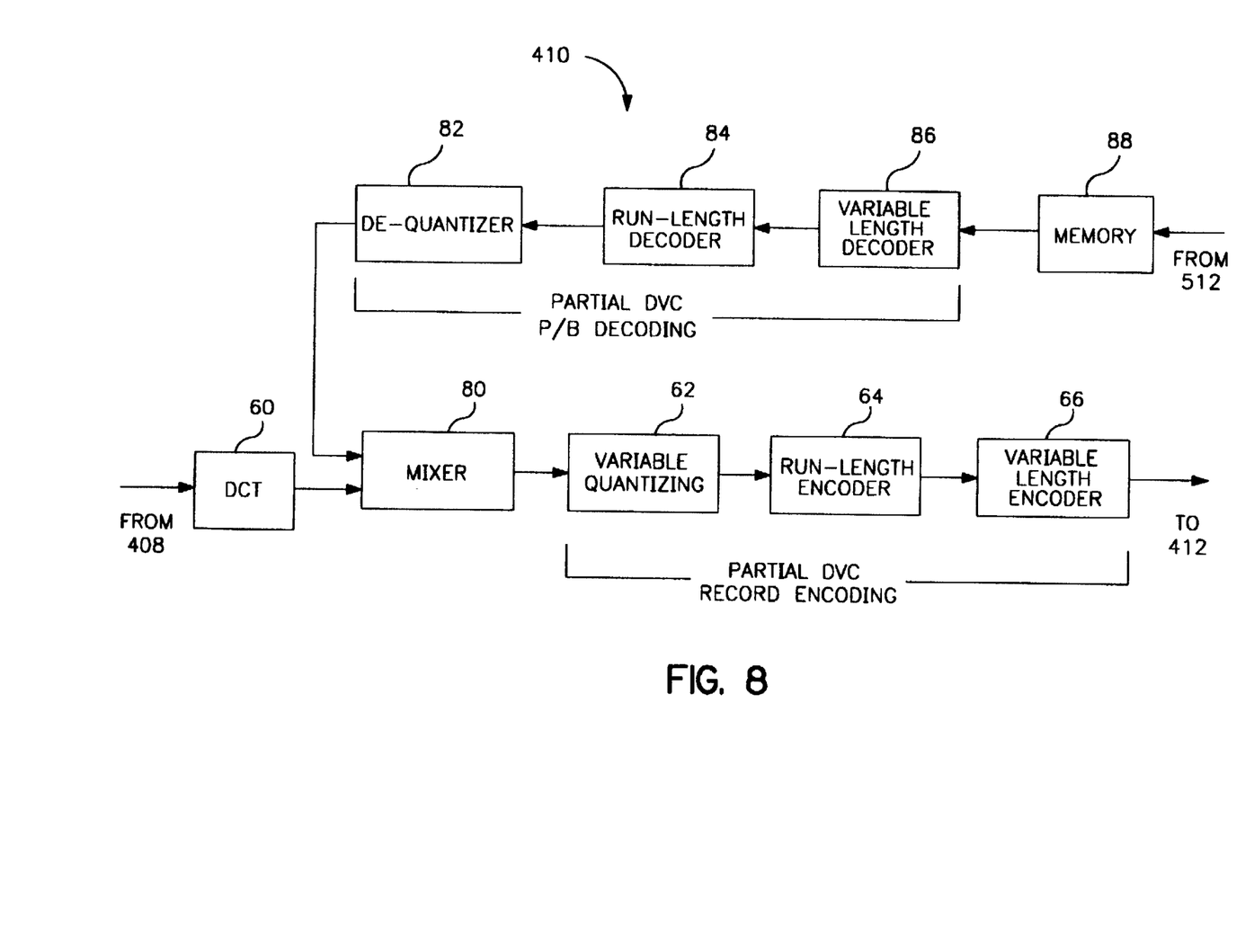
FIG. 8 is a detailed view of the coder shown in FIG. 5, including circuitry for mixing encoded video signals.

FIG. 8 is a block diagram of a second embodiment of coder 410 shown in FIG. 4. The coder 410 shown in FIG. 8 includes circuitry for mixing scenes in a video signal provided from a single video signal source. DCT circuitry 60, variable quantizer 62, run-length encoder 64, and variable length encoder 66 perform the same operations as the similarly numbered components shown in FIG. 6, and thus a description of these components is omitted. Memory 88 receives a transformed playback signal from ECC decoder 512 shown in FIG. 5. The memory 88 may be implemented using a first-in/first-out buffer that acts as a delay for a portion of the transformed playback video signal. The transformed playback video signal is provided to variable length decoder 86, run-length decoder 84, and dequantizer 82. These components perform the same operations as variable length decoder 70, run-length decoder 72, and dequantizer 74 shown in FIG. 7. Accordingly, the description of these components is omitted. The output signals from DCT circuit 60 and dequantizer 82 are provided to mixer 80. Mixer 80 combines the transformed playback signal from dequantizer 82 and a current transformed signal provided by DCT circuit 60 to produce a mixed transformed signal. The details of mixer 80 are described below with reference to FIGS. 9–11. Mixer 80 combines the current transformed video signal and the playback transformed video signal while the signals are in the spatial frequency domain.

Figure 9A:
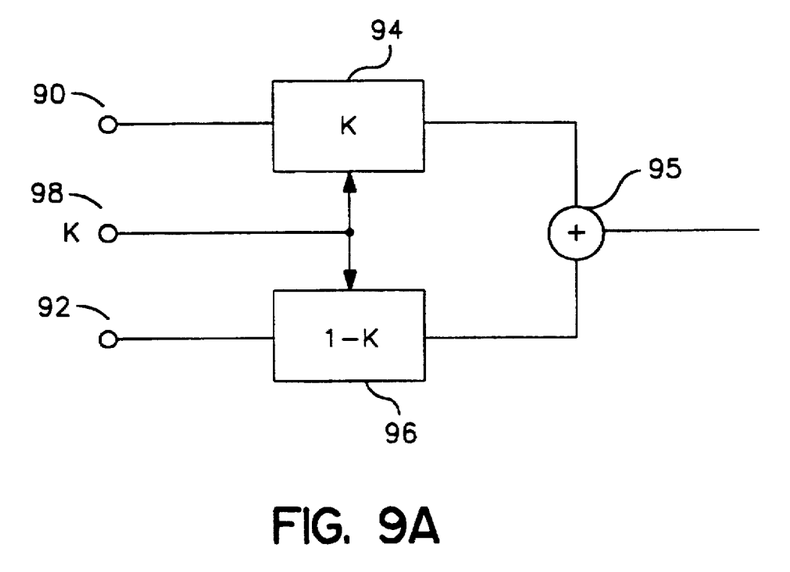
FIG. 9a is a block diagram of a mixing circuit for use in the embodiments shown in FIG. 3 and FIG. 8.
Figure 9B:
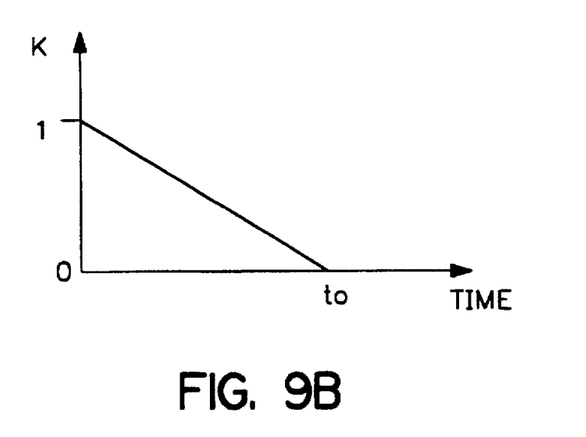

FIG. 9a is a block diagram of one embodiment of the mixer shown in FIG. 3 and FIG. 8. A first video signal is provided to input terminal 90 and a second video signal is provided to input terminal 92. Multipliers 94 and 96 adjust the amplitude of the input video signals based on a coefficient K. The coefficient K may be generated by an operator, by adjusting a variable resistor and digitizing its output signal for example, or may be a prestored function such as that shown in FIG. 9b. As shown in FIG. 9b, K ranges from 1 to 0 over a predetermined amount of time t0. Thus, from time 0 to time t0 the amplitude of the video signal at terminal 90 is reduced from full amplitude to zero amplitude and conversely, the amplitude of the video signal at input terminal 92 is adjusted from zero amplitude to full amplitude. An adder 95 combines the signals produced by multiplier 94 and multiplier 96.

Figures 10A, 10B:
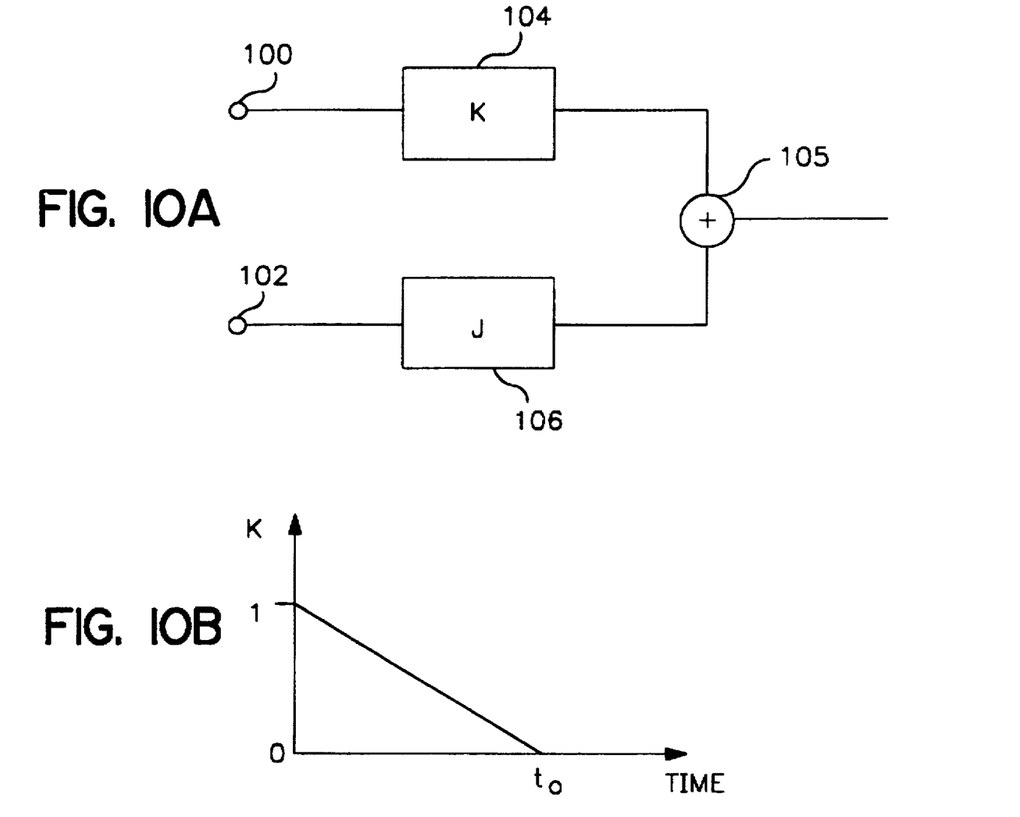
Figure 10C:
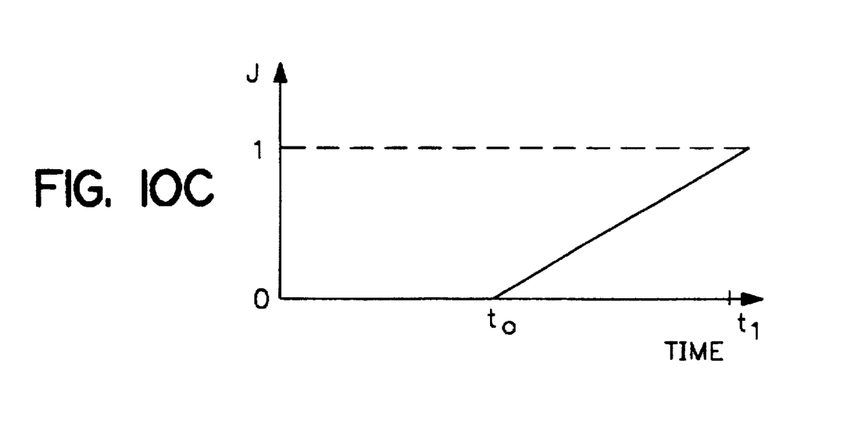

FIG. 10a is a second embodiment of the mixer used in either FIG. 3 or FIG. 8. A first video signal is supplied to input terminal 100 and a second video signal is provided to input terminal 102. Multipliers 104 and 106 adjust the amplitude of the input video signals based on coefficients K and J, respectively. As shown in FIG. 10b, coefficient K ranges from 1 to 0 over a time t0. As shown in FIG. 10c, coefficient J ranges from 0 to 1 over a time t0 to t1. The difference between t0 and t1 is equal to t0. As a result, the video signal provided to input terminal 100 is gradually faded to black by multiplier 104. After the input signal at terminal 100 has been faded to black, the input signal at input terminal 102 is faded from black to full amplitude over the time period t0 to t1. Both coefficients change in response to a time signal t. An adder 105 combines the signals produced by multiplier 104 and multiplier 106.

Figure 11:
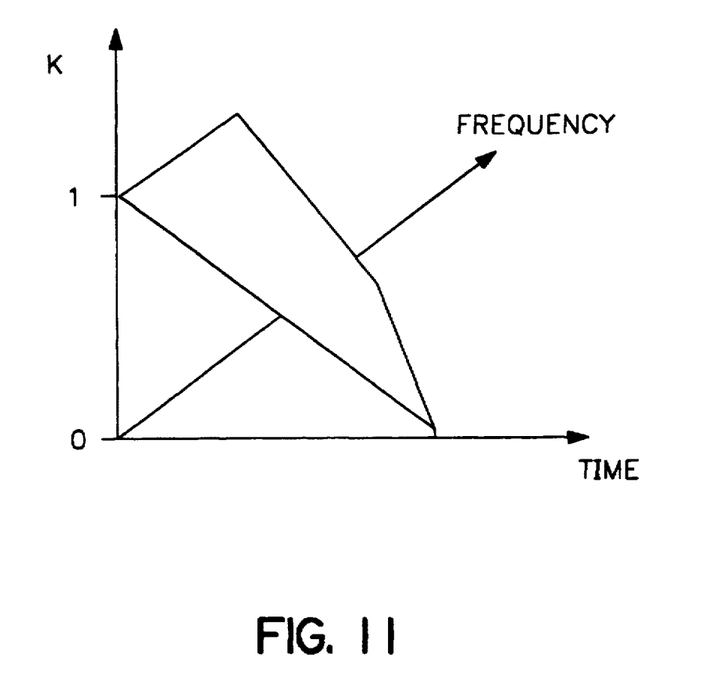
FIG. 11 is a graph of mixing coefficient K for use with the embodiment shown in FIG. 8.

FIG. 11 is a graph of a coefficient K for use in the mixer shown in FIG. 8. The input signals to mixer 80 shown in FIG. 8 comprise a series of coefficients, each representing a frequency within an image. The coefficient K shown in FIG. 11 reduces the amplitude of the high frequency components to zero more rapidly than the low frequency components. Accordingly, a first video signal applied to terminal 90 shown in FIG. 9a is gradually blurred by first removing the high frequency components and subsequently eliminating the lower frequency components. Conversely, the video signal applied to input terminal 92 of FIG. 9a gradually comes into focus with the low frequency components being restored first and the higher frequency components being restored thereafter.

The present invention provides for the mixing of two scenes in a video signal without requiring two video signal sources. The video signal may be in a first domain, such as the spatial domain, or a second domain, such as the spatial frequency domain, when the two scenes are mixed. The mixing circuitry may be included in a stand alone device having an input terminal which receives an input signal from a signal source, such as a consumer camcorder, and an output terminal which provides the mixed video signal to a video tape recorder. This allows the consumer to produce videos having higher production quality without incurring the expense of additional signal sources such as a second camcorder or a second video tape recorder.

While the invention has been described with reference to exemplary embodiments it is not limited thereto. Rather, the appending claims should be construed to include other variant and embodiments of the invention which may be made by those skilled in the art without departing from the true sprit and scope of the present invention.

What is claimed:

1. An apparatus for mixing portions of a video signal produced by a single source, the apparatus comprising:
   a recording section including:
      a transform processor which converts the video signal from a first domain to a second domain to produce a transformed video signal;
      a mixer which receives and combines the transformed video signal and a transformed playback video signal to produce a mixed video signal;
      an encoder coupled to said mixer which encodes the mixed video signal to produce an encoded video signal; and
      an output terminal which provides the encoded signal to a recorder for storing the encoded video signal on a recording medium;
   said playback section including:
      a reader which retrieves a further encoded video signal from said recording medium to produce an encoded playback video signal; and
      a decoder which decodes the further encoded playback video signal to produce said transformed playback video signal.

2. The apparatus of claim 1, said recording section further comprising:
   a shuffler which rearranges the order of portions of said video signal and provides a shuffled video signal to said transform processor.

3. The apparatus of claim 1 wherein said transform processor performs a discrete cosine transform.

4. The apparatus of claim 1, wherein said encoder further comprises:
   a variable quantizer which quantizes the mixed video signal;
   a run-length encoder which run-length encodes an output signal from said variable quantizer; and
   a variable length encoder which variable length encodes an output signal from said run-length encoder to produce said encoded video signal.

5. The apparatus of claim 3, wherein said decoder further comprises:
   a variable length decoder which variable length decodes said encoded playback video signal;
   a run-length decoder which run-length decodes an output signal from said variable length decoder; and
   a variable dequantizer which dequantizes an output signal from said run-length decoder to produce said transformed playback video signal.

6. An apparatus for mixing portions of a video signal produced by a single video source, said apparatus comprising:
   an input terminal which receives a current video signal;
   control means for generating a fade control signal;
   an output terminal for providing the fade control signal to a recorder to selectively enable the recorder to record one of the current video signal and a mixed video signal;
   a memory, coupled to said input terminal, which receives the current video signal and stores a plurality of frames of the current video signal to produce a delayed video signal responsive to the control signal; and
   a mixer, coupled to said input terminal and said memory, which receives and combines the current video signal and the delayed video signal to produce the mixed video signal, the mixer including means for gradually blurring the delayed video signal and means for gradually focusing the current video signal wherein the means for gradually blurring the delayed video signal blurs the delayed video signal by first removing the high spatial frequency components and subsequently eliminating the lower spatial frequency components and the means for gradually focusing the current video signal brings the current signal into focus by first providing lower spatial frequency components and then providing higher spatial frequency components.

* * * * *